United States Patent
Du

(10) Patent No.: US 12,199,543 B2
(45) Date of Patent: Jan. 14, 2025

(54) MOTOR DRIVING METHOD, APPARATUS, AND SYSTEM

(71) Applicant: Huawei Digital Power Technologies Co., Ltd., Guangdong (CN)

(72) Inventor: Ruoyang Du, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 169 days.

(21) Appl. No.: 18/178,553

(22) Filed: Mar. 6, 2023

(65) Prior Publication Data

US 2023/0208343 A1 Jun. 29, 2023

Related U.S. Application Data

(63) Continuation of application No. PCT/CN2021/072172, filed on Jan. 15, 2021.

(51) Int. Cl.
*H02P 29/68* (2016.01)

(52) U.S. Cl.
CPC .................................. *H02P 29/68* (2016.02)

(58) Field of Classification Search
CPC .... H02P 6/28; H02P 2207/03; H02P 21/0021; H02P 25/022; H02M 7/483; B60K 7/0007; F02D 41/10
See application file for complete search history.

(56) References Cited

U.S. PATENT DOCUMENTS

| 9,463,800 | B2 | 10/2016 | Jang et al. | |
|---|---|---|---|---|
| 2013/0069568 | A1* | 3/2013 | Krefta | H02P 21/06 318/400.02 |
| 2013/0320891 | A1 | 12/2013 | Merkel et al. | |
| 2014/0117909 | A1 | 5/2014 | Kim et al. | |
| 2020/0228049 | A1 | 7/2020 | Yoo et al. | |

FOREIGN PATENT DOCUMENTS

| CN | 101388643 A | 3/2009 |
|---|---|---|
| CN | 103993967 A | 8/2014 |
| CN | 106374795 A | 2/2017 |
| CN | 107360734 A | 11/2017 |
| CN | 108238030 A | 7/2018 |
| CN | 109572698 A | 4/2019 |

* cited by examiner

*Primary Examiner* — Antony M Paul

(57) ABSTRACT

The disclosure discloses a motor driving method, an apparatus, and a system, and relate to the chip field. The solution may include: When a motor control apparatus determines that a motor needs to rotate at a maximum torque, the motor control apparatus controls a driver to output a first current to drive the motor to rotate. The first current is greater than a rated peak current of the driver and is less than or equal to a maximum load current of the driver. This method can resolve a problem that a waste of costs is caused because a through-current capability improved by a redundancy design of a switching transistor of a motor driver cannot be fully utilized for most customers and application scenarios.

20 Claims, 9 Drawing Sheets

MOTOR DRIVING METHOD, APPARATUS, AND SYSTEM

CROSS-REFERENCE TO RELATED APPLICATIONS

This is a continuation of International Application No. PCT/CN2021/072172, filed on Jan. 15, 2021, the disclosure of which is hereby incorporated by reference in its entirety.

TECHNICAL FIELD

This relates to the field of chip technologies, and in particular, to a motor driving method, an apparatus, and a system.

BACKGROUND

A motor driver of an electric vehicle usually uses a three-phase full-bridge topology, and outputs a three-phase alternating current to drive a motor to work. When the motor works normally (for example, the motor rotates at a full power), six switching transistors of the motor driver work alternately in a specific order to jointly output the current required by the motor.

To provide a relatively good hill-start capability, the motor of the electric vehicle needs to provide a large output torque in a work status with a zero rotational speed. Therefore, in this work status, the six switching transistors of the motor driver no longer work alternately. Instead, one or several of the switching transistors of the motor driver are used to continuously output a direct current that has an amplitude equal to that of the alternating current to the motor. In this case, because a current value of the direct current output by the switching transistor is equal to the amplitude of the alternating current during normal work, the current value of the direct current is greater than a current value (or referred to as an effective current value) of the foregoing alternating current. Current load borne by the switching transistor is significantly higher than current load borne in another normal work status, for example, a work status in which the motor rotates at a full power. This may cause a life of the switching transistor to be shortened, or even cause the switching transistor to be burnt.

To cope with the current load of the switching transistor of the motor driver in a case that the motor has the zero rotational speed, a redundancy design needs to be used for current characteristics of the switching transistor to improve a through-current capability. Improving the through-current capability of the switching transistor by using the redundancy design usually increases costs of the switching transistor. However, the through-current capability (usually used only in a specific scenario such as a hill start) improved by the redundancy design has a low application probability. Therefore, the through-current capability improved by the redundancy design of the switching transistor of the motor driver cannot be fully utilized for most customers and application scenarios, and a waste of costs is caused.

SUMMARY

Embodiments of this disclosure provide a motor driving method, an apparatus, and a system, to resolve a problem that a waste of costs is caused because a through-current capability improved by a redundancy design of a switching transistor of a motor driver cannot be fully utilized for most customers and application scenarios.

To achieve the foregoing objective, the following technical solutions are used in embodiments of this application.

According to a first aspect, an embodiment of this application provides a motor driving method. The method may be applied to a motor control apparatus in a motor control system, and the motor control apparatus may be configured to control a driver of a motor in a motor driving system. The method includes: when the motor control apparatus determines that the motor needs to rotate at a maximum torque, the motor control apparatus controls the driver to output a first current to drive the motor to rotate. The first current is greater than a rated peak current of the driver (the rated peak current refers to an effective current value of an alternating current output by the driver when the motor rotates normally at a full torque and a full power), and is less than or equal to a maximum load current of the driver (the maximum load current refers to a current value of a direct current output by the driver when the motor is in a blocking status).

According to the foregoing technical solution, when a user (such as a driver) needs to control the motor to rotate at the maximum torque, the motor control apparatus can control the driver to output a current greater than that output when the motor rotates normally at the full torque (that is, make the driver exert a through-current capability improved by a redundancy design of the driver), so that a torque output by the motor is greater than a torque output by the motor rotating normally at the full torque and the full power, thereby increasing power output by a driven piece that is driven by the motor driving system, and improving abrupt acceleration performance of the driven piece.

In a possible implementation, before the motor control apparatus controls the driver to output the first current to drive the motor to rotate, the method further includes: the motor control apparatus obtains a heat capacity margin of the motor driving system. The heat capacity margin may be used to represent a margin of a temperature limit of the motor driving system relative to a current temperature. The motor control apparatus determines, based on the heat capacity margin, whether the current temperature of the motor driving system meets a condition for the motor to rotate at the first current; and correspondingly, that the motor control apparatus controls the driver to output a first current may include: when the current temperature of the motor driving system meets the condition for the motor to rotate at the first current, the motor control apparatus controls the driver to output the first current. In this way, the motor control apparatus can control the driver to drive the motor to output a larger torque only when thermal safety of the motor is ensured, so as to prevent the motor from damage caused by an overhigh temperature, and improve reliability of control by the motor control apparatus over the motor by using the driver.

In another possible implementation, after the motor control apparatus determines, based on the heat capacity margin, whether the current temperature of the motor driving system meets the condition for the motor to rotate at the first current, the method further includes: when the current temperature of the motor driving system does not meet the condition for the motor to rotate at the first current, the motor control apparatus controls the driver to output the rated peak current to drive the motor to rotate. In this way, when the motor control apparatus does not control the driver to output the first current, so as to prevent the motor from damage caused by an overhigh temperature, the motor control apparatus can control the driver to output the rated peak current when thermal safety of the motor is ensured. In this way, the motor is enabled to output a torque as large as possible, thereby meeting a requirement of a user for a relatively large torque output by the motor.

In another possible implementation, that the motor control apparatus obtains a heat capacity margin of the motor driving system includes: the motor control apparatus obtains a temperature of the motor driving system; and the motor control apparatus determines the heat capacity margin based on the temperature of the motor driving system and a motor thermal resistance network model. The motor thermal resistance network model has a function of predicting the heat capacity margin based on the temperature of the motor driving system. In this way, the motor control apparatus can relatively accurately predict the heat capacity margin based on the current temperature of the motor driving system by using the motor thermal resistance network model, so as to improve accuracy of determining, by the motor control apparatus based on the heat capacity margin, whether the motor meets the condition for rotating at the first current.

In another possible implementation, the motor control system further includes a temperature collection module; and correspondingly, that the motor control apparatus obtains a temperature of the motor driving system includes: the motor control apparatus receives the temperature of the motor driving system that is collected by the temperature collection module. In this way, the motor control apparatus can quickly and conveniently obtain the temperature of the motor driving system by using the temperature collection module, thereby facilitating implementation.

In another possible implementation, if the heat capacity margin is greater than a heat capacity margin threshold, the current temperature of the motor driving system meets the condition for the motor to rotate at the first current; or if the heat capacity margin is less than a heat capacity margin threshold, the current temperature of the motor driving system does not meet the condition for the motor to rotate at the first current.

In another possible implementation, that the motor control apparatus determines that the motor needs to rotate at a maximum torque includes: the motor control apparatus obtains instruction information, where the instruction information is used to indicate a rotational speed and a torque that are output by the motor driving system; and the motor control apparatus determines, based on the instruction information, that the motor needs to rotate at the maximum torque. The instruction information may be instruction information (or referred to as a driving instruction) input by a driver, or may be instruction information (that is, a control instruction) generated by using self-driving artificial intelligence, or an instruction indirectly transmitted by using a VCU.

In another possible implementation, the motor control system further includes an instruction collection module; and correspondingly, that the motor control apparatus obtains instruction information includes: the motor control apparatus receives the instruction information collected by the instruction collection module. In this way, the motor control apparatus can quickly and conveniently obtain the instruction information by using the instruction collection module, thereby facilitating implementation.

In another possible implementation, after the motor control apparatus controls the driver to output the first current, the method further includes: the motor control apparatus obtains an output work status of the motor driving system, where the output work status may include a speed value output by the motor driving system; and if the output work status of the motor driving system is equal to a target output work status corresponding to the instruction information, the motor control apparatus controls the driver to output the rated peak current, where the target output work status includes a target speed value that is output by the motor driving system and that corresponds to the instruction information. In this way, after the output work status of the motor driving system reaches the target output work status, the motor control apparatus can control the driver to perform output according to a regular rated peak current, so as to prevent the driver from a relatively large life loss caused when the driver outputs the first current for a long time.

In another possible implementation, the motor control system further includes a work status collection module; and correspondingly, that the motor control apparatus obtains an output work status of the motor driving system includes: the motor control apparatus receives the output work status of the motor driving system that is collected by the work status collection module. In this way, the motor control apparatus can quickly and conveniently obtain the output work status of the motor driving system by using the work status collection module, thereby facilitating implementation.

In another possible implementation, after the motor control apparatus controls the driver to output the first current, the method further includes: the motor control apparatus determines, based on the temperature of the motor driving system, the instruction information, and a temperature prediction model, sustainable duration in which the motor rotates when being driven by the first current output by the driver, where the temperature prediction model has a function of predicting the sustainable duration based on a temperature of the motor and the instruction information; and if rotation duration, of the motor, that starts when the driver output the first current is equal to the sustainable duration, the motor control apparatus controls the driver to output the rated peak current. This can avoid a problem that the motor reaches an overhigh temperature and is damaged because the motor control apparatus controls the driver to output the first current for a long time to drive the motor to rotate, thereby improving reliability of a process in which the motor control apparatus drives the motor by controlling the driver.

According to a second aspect, an embodiment of this application provides a motor control apparatus. The apparatus may be applied to a motor control system, so as to control a driver of a motor in a motor driving system. The apparatus may be configured to implement the method in the first aspect. A function of the apparatus may be implemented by hardware, or may be implemented by hardware by executing corresponding software. The hardware or the software includes one or more modules corresponding to the foregoing functions, for example, an instruction parsing module, a temperature prediction module, and an output control module.

The instruction parsing module may be configured to determine that the motor needs to rotate at a maximum torque.

The output control module is configured to control the driver to output a first current to drive the motor to rotate. The first current is greater than a rated peak current of the driver and is less than or equal to a maximum load current of the driver.

In a possible implementation, the temperature prediction module is configured to obtain a heat capacity margin of the motor driving system. The heat capacity margin is used to represent a margin of a temperature limit of the motor driving system relative to a current temperature. The output control module is further configured to determine, based on the heat capacity margin, whether the current temperature of the motor driving system meets a condition for the motor to rotate at the first current. The output control module is specifically configured to: when the current temperature of the motor driving system meets the condition for the motor to rotate at the first current, control the driver to output the first current.

In another possible implementation, the output control module is further configured to: when the current temperature of the motor driving system does not meet the condition for the motor to rotate at the first current, control the driver to output the rated peak current to drive the motor to rotate.

In another possible implementation, the temperature prediction module is specifically configured to obtain a temperature of the motor driving system; and determine the heat capacity margin based on the temperature of the motor driving system and a motor thermal resistance network model. The motor thermal resistance network model has a function of predicting the heat capacity margin based on the temperature of the motor driving system.

In another possible implementation, the motor control system further includes a temperature collection module. The temperature prediction module is specifically configured to receive the temperature of the motor driving system that is collected by the temperature collection module.

In another possible implementation, if the heat capacity margin is greater than a heat capacity margin threshold, the current temperature of the motor driving system meets the condition for the motor to rotate at the first current; or if the heat capacity margin is less than a heat capacity margin threshold, the current temperature of the motor driving system does not meet the condition for the motor to rotate at the first current.

In another possible implementation, the instruction parsing module is specifically configured to obtain instruction information, where the instruction information is used to indicate a rotational speed and a torque that are output by the motor driving system; and determine, based on the instruction information, that the motor needs to rotate at the maximum torque.

In another possible implementation, the motor control system further includes an instruction collection module.

The instruction parsing module is specifically configured to receive the instruction information collected by the instruction collection module.

In another possible implementation, the output control module is further configured to obtain an output work status of the motor driving system, where the output work status includes a speed value output by the motor driving system; and if the output work status of the motor driving system is equal to a target output work status corresponding to the instruction information, control the driver to output the rated peak current, where the target output work status includes a target speed value that is output by the motor driving system and that corresponds to the instruction information.

In another possible implementation, the motor control system further includes a work status collection module.

The output control module is specifically configured to receive the output work status of the motor driving system that is collected by the work status collection module.

In another possible implementation, the output control module is further configured to determine, based on the temperature of the motor driving system, the instruction information, and a temperature prediction model, sustainable duration in which the motor rotates when being driven by the first current output by the driver, where the temperature prediction model has a function of predicting the sustainable duration based on a temperature of the motor and the instruction information; and if rotation duration, of the motor, that starts when the driver outputs the first current is equal to the sustainable duration, control the driver to output the rated peak current.

According to a third aspect, an embodiment of this application provides a motor control system, including a motor control apparatus. The motor control apparatus is configured to implement the motor driving method according to any one of the first aspect or the possible implementations of the first aspect.

According to a fourth aspect, an embodiment of this application provides a vehicle, including the motor control apparatus according to any one of the second aspect or the possible implementations of the second aspect.

It should be understood that, for beneficial effects of the second aspect to the fourth aspect, refer to the related descriptions in the first aspect. Details are not described herein again.

DESCRIPTION OF EMBODIMENTS

An electric vehicle is a vehicle that uses electricity as an energy source and that travels by using a motor driving system to drive wheels to rotate. The motor driving system may usually include components such as a motor, a driver (or referred to as a motor driver), a reducer, and the like. Generally, the electric vehicle may control, by using a microcontroller unit (MCU), the driver of the motor driving system to drive the motor to work. For example, the microcontroller unit may send a corresponding control instruction to the driver based on a driving instruction (for example, a torque instruction used to indicate a torque output by the motor) sent by a vehicle control unit (VCU), and control the driver to output a voltage and/or a current corresponding to the control instruction. In this way, the motor is driven to output a corresponding torque and a corresponding rotational speed, so that the motor driving system drives the wheels to output power.

The driver may use a three-phase full-bridge topology or a multi-phase (>3) topology, and output a three-phase or multiphase alternating current to drive the motor to work. Each phase of the driver may be controlled by two corresponding switching transistors.

For example, the driver uses a three-phase topology. When the electric vehicle travels normally, in other words, when the motor rotates normally, six switching transistors of the driver may alternately work in a specific order to jointly output a current required by the motor. When an alternating current output by the driver is equal to a rated peak current of the driver, the motor may be driven to rotate at a full torque and a full power.

Figure 1A:
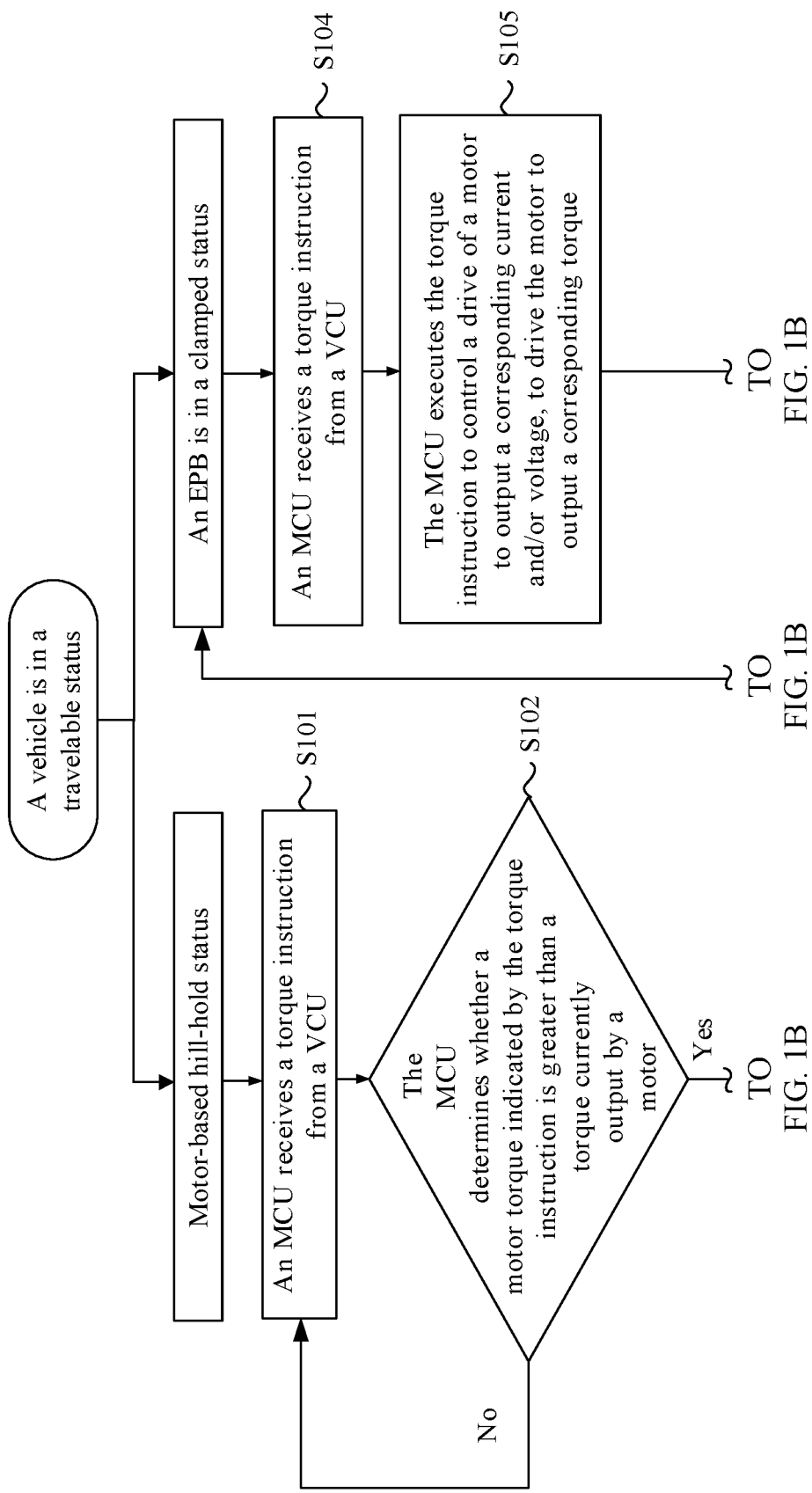
FIG. 1A and FIG. 1B are a schematic flowchart of a hill-start method according to a related technology.
Figure 1B:
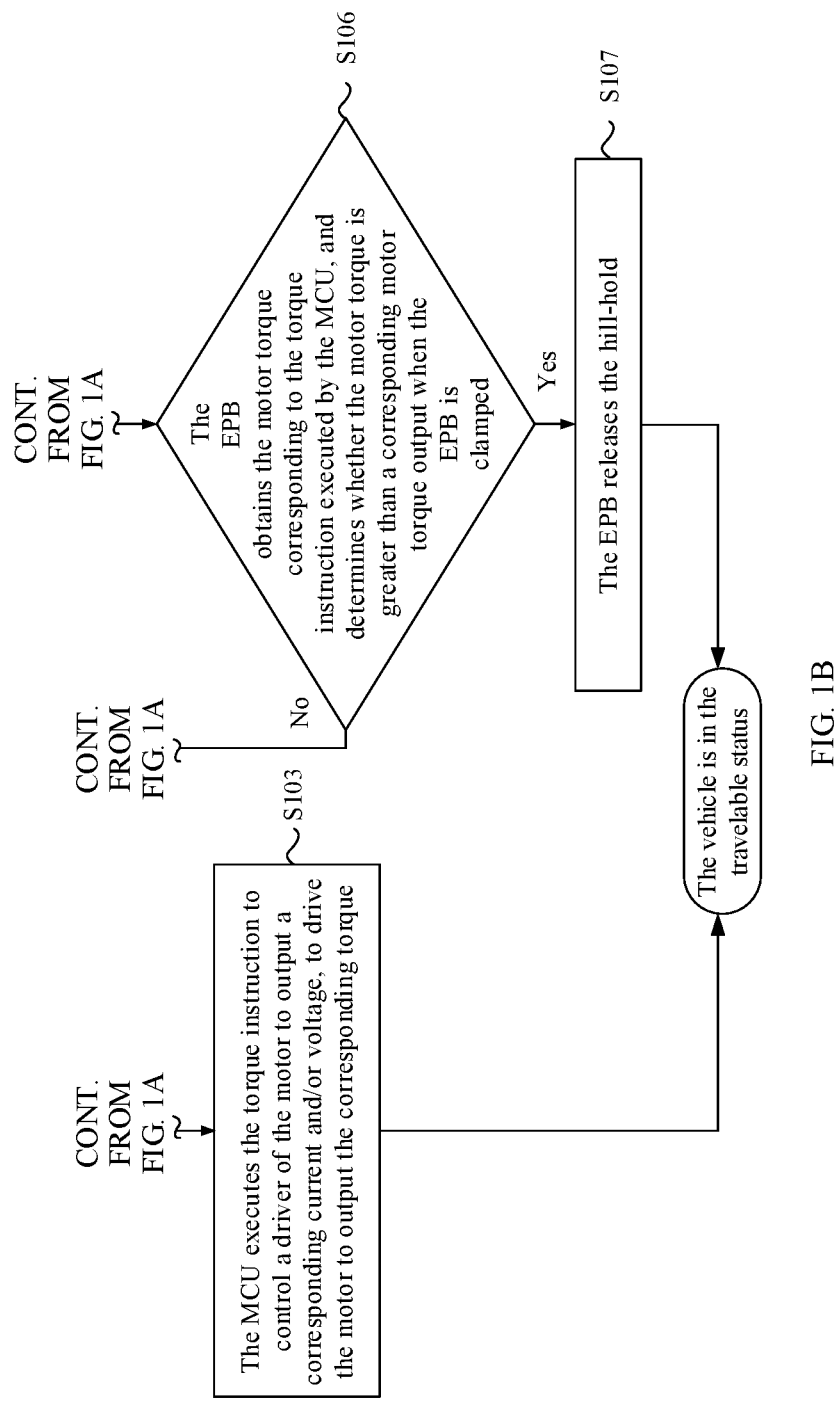

When the electric vehicle needs a hill start, but the power output by the wheels driven by the motor driving system is not enough to balance out a sliding force of the electric vehicle, a slip phenomenon is likely to occur on the electric vehicle. Therefore, when detecting that the electric vehicle is in a hill-start status, the microcontroller unit may control the driver to output a maximum current to drive the motor to output a relatively large torque. In this way, the motor driving system drives the wheels to output relatively high power to balance out the sliding force to which the electric vehicle is subjected, so as to implement a short hill hold in a hill-start process of the electric vehicle. When the electric vehicle performs the short hill hold, the motor driving system is controlled by using the microcontroller unit to implement a start, thereby preventing the electric vehicle from the slip phenomenon in the hill-start process. For example, in the hill-start process of the electric vehicle, a microcontroller unit in a related technology may control the motor driving system by using a method shown in FIG. 1A and FIG. 1B. As shown in FIG. 1A and FIG. 1B, the method may include the following S101 to S107.

When the electric vehicle is in a travelable status, and a hill-hold status is a driver and motor based hill hold (namely, the foregoing short hill hold):
S101: An MCU receives a torque instruction from a VCU.
S102: The MCU determines whether a motor torque indicated by the torque instruction is greater than a torque currently output by the motor (namely, a torque of the motor for the hill hold).

If the motor torque indicated by the torque instruction is greater than the torque currently output by the motor, S103 is performed: The MCU executes the torque instruction to control the driver to output a corresponding current and/or voltage, to drive the motor to output the corresponding torque.

When the electric vehicle is in the travelable status, and the hill-hold status is an electrical park brake (EPB) based hill hold (that is, the EPB is in a clamped status):
S104: An MCU receives a torque instruction from a VCU.
S105: The MCU executes the torque instruction to control the driver to output a corresponding current and/or voltage, to drive the motor to output a corresponding torque.
S106: The EPB obtains the motor torque corresponding to the torque instruction executed by the MCU, and determines whether the motor torque is greater than a corresponding motor torque output when the EPB is clamped.

If the motor torque is greater than the corresponding motor torque output when the EPB is clamped, S107 is performed: The EPB releases the hill hold, that is, the EPB is unlocked (or is released from the clamped status).

When the electric vehicle is in a short hill hold, the motor is in a blocking status (that is, the motor outputs a corresponding torque but does not rotate). Therefore, the switching transistors of the driver do not work alternately, but continuously output a direct current whose maximum current value is equal to an amplitude of the alternating current output when the motor works normally. The maximum current value of the direct current is equal to the amplitude of the alternating current. Therefore, the current value of the direct current is greater than an effective current value of the alternating current. In other words, current load borne by the switching transistors of the driver when the electric vehicle is in a short hill hold is higher than current load borne by the switch transistors when the electric vehicle travels normally. Therefore, when the driver is set, a redundancy design needs be used for current characteristics of each switching transistor of the driver, so that a through-current capability of each switching transistor is improved, and the switch transistor can meet current load that needs be borne when the electric vehicle is in a short hill hold. However, in actual application, the through-current capability, of the switching transistor of the driver, that is improved by using the redundancy design is applied only to the hill-start process, and has a relatively low use frequency (or probability). In another scenario, performance of the switching transistor cannot be fully utilized, and the redundancy design of the switching transistor increases costs of the switching transistor, causing a waste of costs.

To resolve the foregoing problem, an embodiment of this application provides a motor driving method. The motor driving method may be applied to a motor control apparatus in a motor control system. The motor control apparatus can control, based on a torque required by a motor in a motor driving system, a driver of the motor to output a corresponding current and/or voltage to the motor, so as to drive the motor to output the corresponding torque. The motor driving system may be a powertrain of an electric vehicle to drive wheels of the electric vehicle. The motor driving system may be further configured to drive another driven piece. This is not limited herein.

In the method, in a scenario in which the motor driving system needs to drive a driven piece to output relatively high power, the motor control apparatus controls the driver of the motor in the motor driving system to output a larger current. In this way, the motor is driven to output a maximum torque for rotation, thereby meeting a requirement such as abrupt acceleration of the driven piece. The method may include: when the motor control apparatus determines that the motor needs to rotate at the maximum torque, the motor control apparatus controls the driver to output a first current to drive the motor to rotate. A current value of the first current is greater than a rated peak current of the driver (the rated peak current is an effective current value of an alternating current output by the driver when the motor rotates at a full torque and a full power), and the current value of the first current is less than or equal to a maximum load current of the driver (the maximum load current is a current value of a direct current output by the driver when the motor is in a blocking status).

In this way, when the motor driving system needs to drive the driven piece to output relatively high power, the motor control apparatus can control the driver to output a larger current (that is, make the driver exert a through-current capability improved by a redundancy design of the driver), so that a torque output by the motor is higher than a torque output by the motor rotating at the full torque and the full power in a normal case, thereby increasing the power output by the driven piece when being driven by the motor driving system, and improving abrupt acceleration performance of the driven piece.

Figure 2:
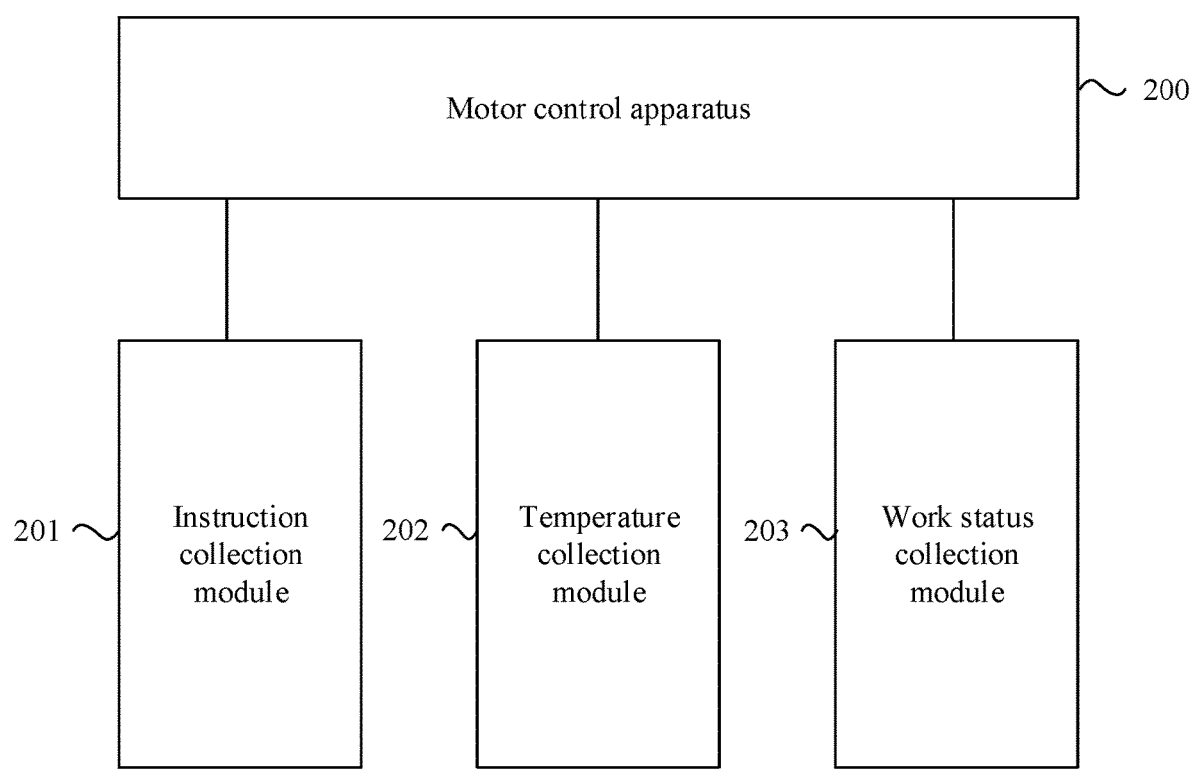
FIG. 2 is a schematic diagram of a composition of a motor control system according to an embodiment of this application.

The motor control system may further include a module, a unit, or the like that is configured to collect status information of the motor driving system. This is not limited herein. For example, FIG. 2 is a schematic diagram of a composition of a motor control system according to an embodiment of this application. As shown in FIG. 2, the motor control system may include a motor control apparatus 200 and an instruction collection module 201 (or a driving instruction collection module), a temperature collection module 202, and a work status collection module 203 that are communicatively connected to the motor control apparatus 200 separately. The instruction collection module 201 may be configured to collect a driving instruction of a driver. The temperature collection module 202 may be configured to measure and collect a temperature of the motor driving system. The work status collection module 203 may be configured to measure and collect a work status output by the motor driving system. The motor control apparatus may be communicatively connected to the driver of the motor in the motor driving system, so that the motor control apparatus controls the driver to output a corresponding current and/or voltage.

It should be noted that, in this embodiment of this application, the motor control apparatus may be implemented by hardware, or may be implemented in a form of software combined with hardware. This is not limited herein. For example, the motor control apparatus may be the foregoing MCU, a unit or module integrated in a VCU, a domain controller, or the like.

With reference to the accompanying drawings, the following describes an example in which the motor driving system is the powertrain of the electric vehicle, the electric driving system needs to drive the wheels to output maximum power to implement abrupt acceleration of the electric vehicle, and the first current is equal to the maximum load current of the driver. A specific implementation of the motor driving method provided in this embodiment of this application is described. The method may be applied to the motor control apparatus 200 in the motor control system shown in FIG. 2.

Figure 3:
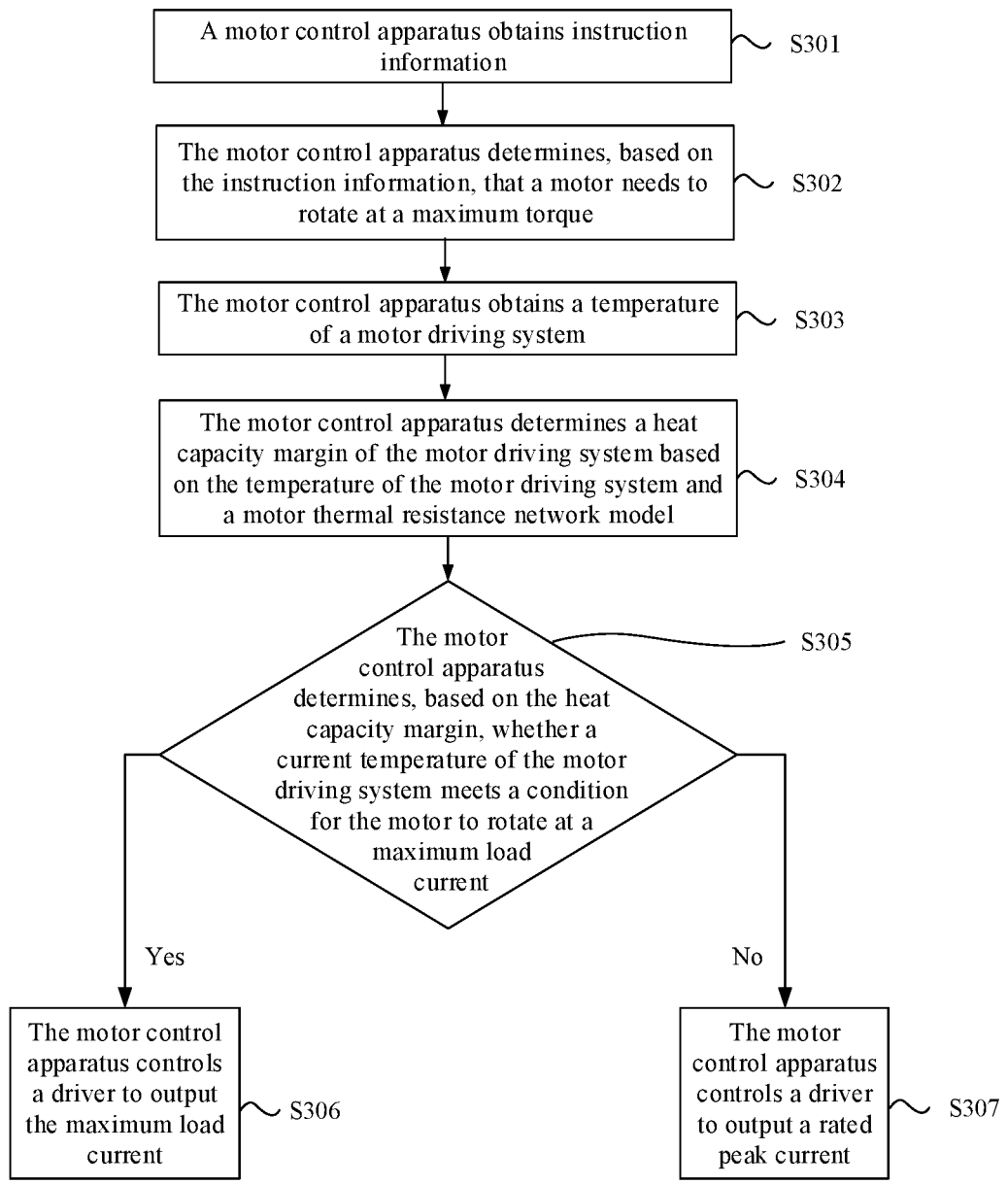
FIG. 3 is a schematic flowchart of a motor driving method according to an embodiment of this application.

FIG. 3 is a schematic flowchart of the motor driving method according to an embodiment of this application. As shown in FIG. 3, the motor driving method may include the following S301 to S307.

S301: A motor control apparatus obtains instruction information.

The instruction information may be information used to indicate a rotational speed and a torque that need to be output by a motor driving system.

It should be noted that, the instruction information may be instruction information (or referred to as a driving instruction) that is input by a driver and collected by an instruction collection module, or may be instruction information (that is, a control instruction) generated by self-driving artificial intelligence (AI), or an instruction indirectly transmitted by using a VCU. This is not limited herein.

In some possible implementations, the motor control apparatus may obtain the instruction information by using the instruction collection module (for example, the instruction collection module 201 in the motor control system shown in FIG. 2). After receiving the collected instruction information, the instruction collection module may send the collected instruction information to the motor control apparatus.

For example, the instruction collection module may include an acceleration pedal (or referred to as an ignition switch, which is equivalent to an accelerator of a fuel vehicle). The driver may input a driving instruction by stepping on the accelerator pedal. For example, the driver may input, by stepping on the acceleration pedal by different depths, driving instructions that are used to indicate a rotational speed value of the motor of the motor driving system. Alternatively, the driver may further input, by quickly stepping on the acceleration pedal, a driving instruction or the like that is used to instruct the motor of the motor driving system to output a large torque. This is not limited herein. After receiving the driving instruction input by the driver, the acceleration pedal may send a corresponding driving instruction (that is, instruction information) to the motor control apparatus, so that the motor control apparatus can analyze the instruction information, and determine whether the driver needs to be controlled to drive the motor to output a maximum torque. Optionally, the instruction collection module may further include a brake pedal, a steering gear, and the like. This is not limited herein.

In some other possible implementations, the motor control apparatus may alternatively receive the instruction information. For example, the self-driving AI generates the instruction information and sends the instruction information to the motor control apparatus, so that the motor control apparatus can analyze the instruction information, and determine whether the driver needs to be controlled to drive the motor to output the maximum torque.

S302: The motor control apparatus determines, based on the instruction information, that a motor needs to rotate at a maximum torque.

A case in which the motor needs to rotate at the maximum torque may be as follows: The electric vehicle needs to accelerate abruptly, the electric vehicle needs to climb a slope, the electric vehicle needs to cross a pit, or the like. Therefore, when the driver or the self-driving AI controls, by using the instruction information, the electric vehicle to perform an operation such as abrupt acceleration, slope-climbing, or pit-crossing, the motor control apparatus can determine, based on the corresponding instruction information, that the motor needs to rotate at the maximum torque.

For example, the motor control apparatus obtains the instruction information by using the instruction collection module, and the instruction collection module includes the acceleration pedal. When the driver needs to control the electric vehicle to perform abrupt acceleration, the driver may input the instruction information by quickly stepping on the acceleration pedal (or slamming the acceleration pedal). The acceleration pedal sends, to the motor control apparatus, the collected instruction information generated when the driver quickly steps on the acceleration pedal, and the motor control apparatus can analyze the received instruction information to determine that the motor needs to rotate at the maximum torque.

For another example, when the self-driving AI needs to control the electric vehicle to perform abrupt acceleration, the self-driving AI may generate corresponding instruction information to indicate a rotational speed, a torque, and the like that are required by the motor (for example, the instruction information instructs the motor to rotate at the maximum torque). The self-driving AI sends the instruction information to the motor control apparatus, so that the motor control apparatus can determine, based on the received instruction information, that the motor needs to rotate at the maximum torque.

S303: The motor control apparatus obtains a temperature of a motor driving system.

The temperature of the motor driving system may be a temperature of a key component in the motor driving system, for example, may include a temperature of the motor in the motor driving system, a temperature of the driver, and the like. This is not limited herein.

In some possible implementations, the motor control apparatus may obtain the temperature of the motor driving system by using a temperature collection module (for example, the temperature collection module 202 in the motor control system shown in FIG. 2). After measuring and collecting the temperature of the motor driving system, the temperature collection module may send the collected temperature to the motor control apparatus.

Figure 4:
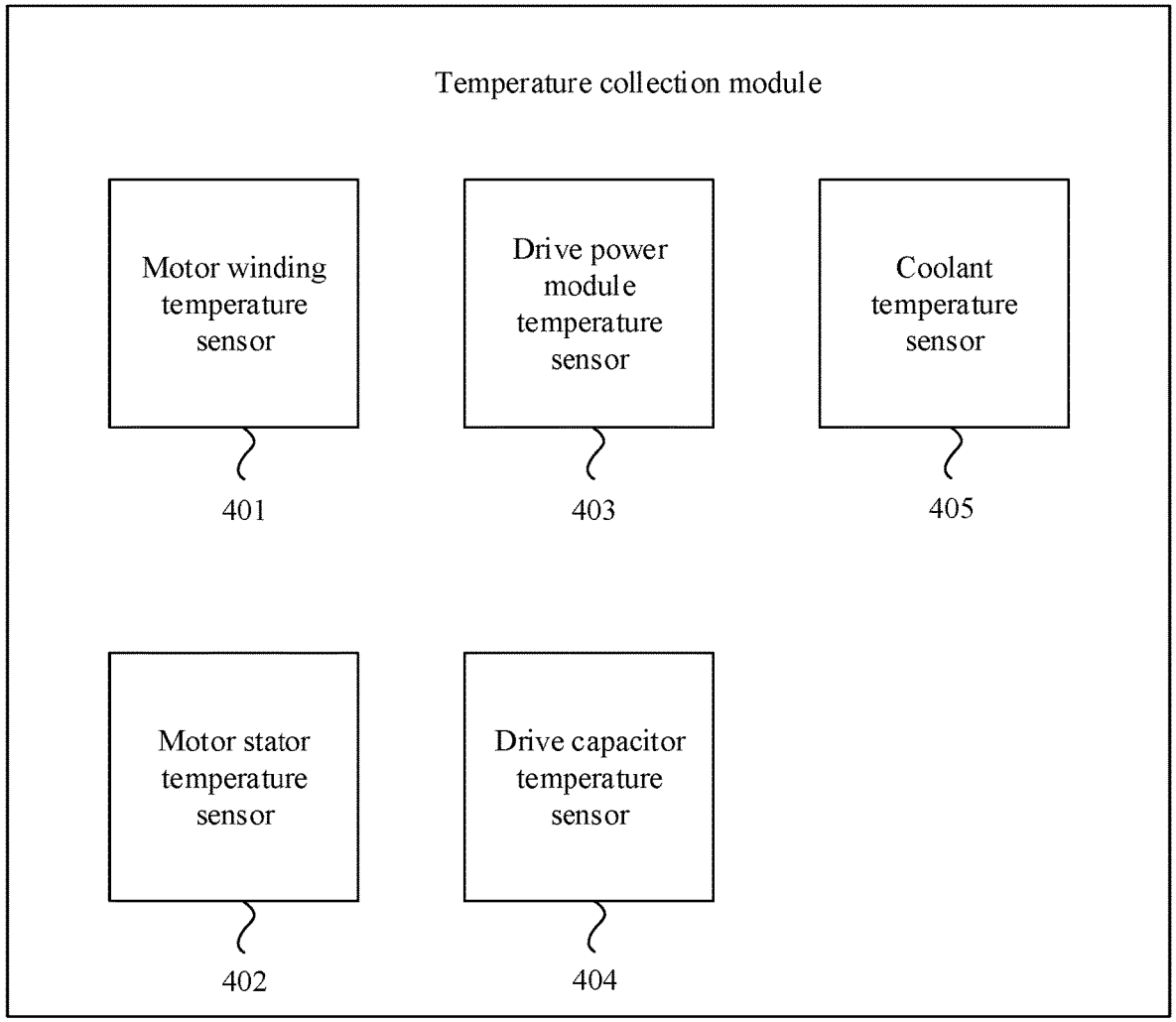
FIG. 4 is a schematic diagram of a composition of a temperature collection module according to an embodiment of this application.

For example, as shown in FIG. 4, the temperature collection module may include a motor winding temperature sensor 401 disposed on a motor winding, a motor stator temperature sensor 402 disposed on a motor stator, a drive power module temperature sensor 403 disposed on a drive power module, and a drive capacitor temperature sensor 404 disposed on a drive capacitor. Optionally, the motor control apparatus may determine the temperature of the motor driving system by using the foregoing one or more temperature sensors in the temperature collection module. For example, the motor winding temperature sensor 401 in the temperature collection module may send a collected temperature of the motor winding to the motor control apparatus, and the motor stator temperature sensor 402 may send a collected temperature of the motor stator to the motor control apparatus, so that the motor control apparatus can determine a current temperature of the motor, and use the current temperature of the motor as the temperature of the motor driving system. For another example, the drive power module temperature sensor 403 in the temperature collection module may send a collected temperature of the drive power module to the motor control apparatus, and the drive capacitor temperature sensor 404 may send a collected temperature of the drive capacitor to the motor control apparatus, so that the motor control apparatus can determine a current temperature of the driver, and use the current temperature of the driver as the temperature of the motor driving system. For another example, the motor control apparatus may further determine the temperature of the motor driving system by receiving temperatures of different components in the motor driving system that are sent by the foregoing temperature sensors. This is not limited herein.

Optionally, as shown in FIG. 4, the temperature collection module may further include a coolant temperature sensor 405 disposed on a cooling apparatus of the motor driving system. The motor control apparatus may determine a current temperature of a coolant by using a coolant temperature collected by the coolant temperature sensor 405, so that the motor control apparatus can determine the temperature of the motor driving system with reference to the current temperature of the coolant.

S304: The motor control apparatus determines a heat capacity margin of the motor driving system based on the temperature of the motor driving system and a motor thermal resistance network model.

The heat capacity margin may be a parameter used to represent a margin of a temperature limit of the motor driving system relative to a current temperature. The motor thermal resistance network model has a function of predicting the heat capacity margin based on the temperature of the motor driving system. For example, a thermal resistance network model commonly used in the motor driving system may be used, or the thermal resistance network model may be optimized for use based on an actual requirement (for example, a thermal resistance network model with precision optimized is used). This is not limited herein. For example, a loss of each component in the motor driving system may be determined based on information such as a voltage, a current, and a rotational speed of the motor that are output by the driver. Then, the loss is input to the thermal resistance network model to calculate a difference between the current temperature of the motor driving system and the temperature limit, so as to determine the heat capacity margin and the like.

For example, the loss of each component in the motor driving system may include a motor stator loss, a motor rotor loss, and a motor coil loss. Calculation of the foregoing losses may include: First, the voltage output by the driver is decomposed. Then, $I_d$ and $I_q$ are obtained by calculation by using $U_d$ and $U_q$ that are obtained by decomposition. Further, the motor stator loss, the motor rotor loss, and the motor coil loss at a moment n are calculated by using $I_d$ and $I_q$.

Based on the heat capacity margin, the motor control apparatus can determine whether the current temperature of the motor driving system is close to the temperature limit. This helps subsequently determine whether the motor driving system can rotate at a maximum load current.

S305: The motor control apparatus determines, based on the heat capacity margin, whether a current temperature of the motor driving system meets a condition for the motor to rotate at a maximum load current.

In some possible implementations, the current temperature of the motor driving system meets the condition for the motor to rotate at the maximum load current. The condition may include: The heat capacity margin is greater than a heat capacity margin threshold. In other words, when the heat capacity margin is greater than the heat capacity margin threshold, it indicates that the heat capacity margin of the motor driving system is sufficient, a difference between the current temperature and the temperature limit is relatively large, and the current temperature of the motor driving system meets the condition for the motor to rotate at the maximum load current. When the heat capacity margin is less than the heat capacity margin threshold, it indicates that the heat capacity margin of the motor driving system is insufficient, the difference between the current temperature and the temperature limit is relatively small, and the current temperature of the motor driving system does not meet the condition for the motor to rotate at the maximum load current. When the heat capacity margin is equal to the heat capacity margin threshold, the current temperature of the motor driving system meets the condition for the motor to rotate at the maximum load current, or it may be determined that the current temperature of the motor driving system does not meet the condition for the motor to rotate at the maximum load current. A person skilled in the art may set, based on an actual design requirement, a case in which the heat capacity margin is equal to the heat capacity margin threshold. This is not limited herein.

It should be noted that, the heat capacity margin threshold is a preconfigured parameter value used to determine whether the heat capacity margin is sufficient. A person skilled in the art may set a value of the heat capacity margin threshold based on a performance requirement of the motor driving system. This is not limited herein. For example, the person skilled in the art may set the heat capacity margin threshold to a relatively small value, to ignore a loss caused by a temperature rise of the motor driving system, so that the motor can rotate as much as possible at the maximum load current under control by the motor control apparatus. Alternatively, considering a heat loss of the motor driving system, the person skilled in the art may set the heat capacity margin threshold to a relatively large value, so that the motor rotates at the maximum load current and at a relatively small heat loss under control by the motor control apparatus.

In some other possible implementations, that the current temperature of the motor driving system meets the condition for the motor to rotate at the maximum load current may further include whether the heat capacity margin is zero, or the like. This is not limited herein.

If the current temperature of the motor driving system meets the condition for the motor to rotate at the maximum load current, the following S306 is performed. If the current temperature of the motor driving system does not meet the condition for the motor to rotate at the maximum load current, the following S307 is performed.

S306: The motor control apparatus controls the driver to output the maximum load current (that is, controls the driver to perform output at a full margin) to drive the motor to rotate.

S307: The motor control apparatus controls the driver to output a rated peak current (that is, controls the driver to perform normal output) to drive the motor to rotate.

The maximum load current is a maximum current value of a direct current output by the driver when the motor is in a blocking status. To be specific, the maximum load current is a maximum current value that can be borne by a through-current capability improved by using a redundancy design. The redundancy design is used by a power module (for example, a switching transistor) of the driver to implement a short hill hold (or referred to as a motor-based hill hold) in a hill start. The maximum load current output by the driver may be an alternating current or a direct current. When the driver outputs an alternating current, the maximum load current refers to an effective current value of the alternating current, so as to increase the torque output by the motor.

The rated peak current is an effective current value of the alternating current output by the driver when the motor works normally at a full torque and a full power. In other words, when the motor does not use a redundancy design to improve the through-current capability to implement a short hill hold in a hill start, the rated peak current is an effective current value of the alternating current output by the driver upon the full torque of the motor. Therefore, the maximum load current may be an alternating current amplitude corresponding to the rated peak current.

Figure 5:
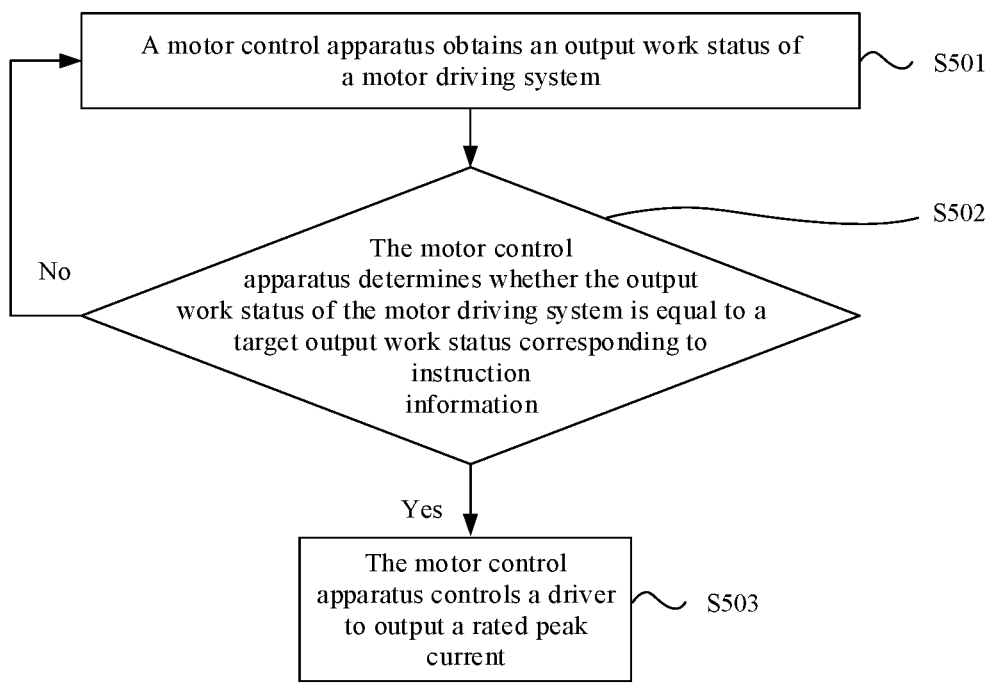
FIG. 5 is a schematic flowchart of one adjustment of current output of a driver according to an embodiment of this application.

After the motor control apparatus controls, based on the obtained instruction information, the driver to output the maximum load current, the motor control apparatus may further determine, based on the temperature of the motor driving system and an output work status, whether current output of the driver needs to be adjusted. For example, FIG. 5 is a schematic flowchart of one adjustment of the current output of the driver according to an embodiment of this application. As shown in FIG. 5, this procedure may include the following S501 to S503:

S501: The motor control apparatus obtains an output work status of the motor driving system.

The output work status of the motor driving system may be a rotational speed output by the motor driving system, to be specific, a speed at which the motor driving system drives wheels to rotate. The output work status of the motor driving system may alternatively be a speed at which the motor driving system drives the electric vehicle (that is, a speed value output by the motor driving system), namely, a vehicle speed of the electric vehicle. This is not limited herein.

In some possible implementations, the motor driving system may obtain the output work status of the motor driving system by using a work status collection module.

The work status collection module may send the collected output work status of the motor driving system to the motor control apparatus.

For example, the work status collection module may include a speed sensor disposed on the electric vehicle. By using the speed sensor, a rotational speed of the motor of the electric vehicle can be collected. The speed sensor may send the collected rotational speed of the motor of the electric vehicle to the motor control apparatus, so that the motor control apparatus can subsequently determine, based on the output work status of the motor driving system, whether the current output of the driver needs to be adjusted.

S502: The motor control apparatus determines whether the output work status of the motor driving system is equal to a target output work status corresponding to the instruction information (that is, whether the output work status of the motor driving system reaches the target output work status).

The target output work status corresponding to the instruction information refers to an output work status corresponding to a rotational speed and a torque that are indicated by the instruction information and that the motor driving system needs to output, in other words, the instruction information indicates an output work status that the motor driving system needs to reach.

For example, the instruction information may be an instruction that is input by a driver or self-driving AI and that instructs the electric vehicle to perform abrupt acceleration. The instruction information may include the rotational speed and the torque that the motor driving system needs to output. Because the rotational speed output by the motor driving system corresponds to the speed of the electric vehicle, the motor control apparatus may obtain, based on the rotational speed in the received instruction information, a speed that the electric vehicle needs to reach, that is, a target vehicle speed of the electric vehicle that corresponds to the instruction information (the target vehicle speed is the foregoing target output work status).

If the output work status is equal to the target output work status, the following S503 is performed.

S503: The motor control apparatus controls the driver to output the rated peak current.

S503 is the same as S307 in the method shown in FIG. 3, and details are not described herein.

If the output work status is not equal to the target output work status, S501 may be performed again until the output work status is equal to the target output work status.

Figure 6:
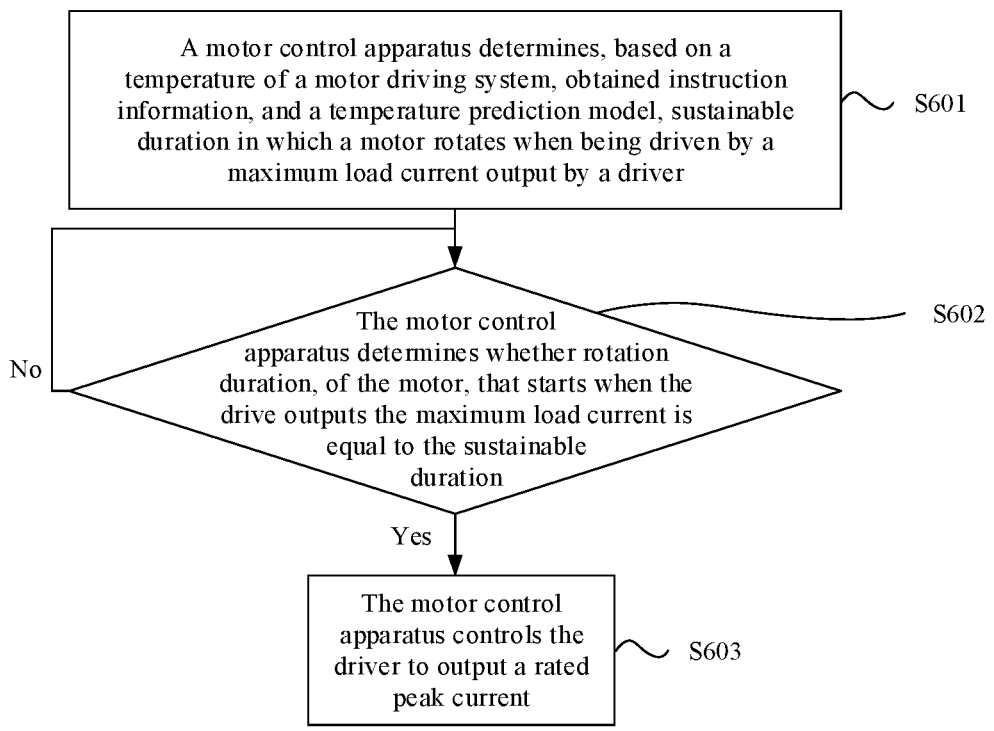
FIG. 6 is a schematic flowchart of another adjustment of current output of a driver according to an embodiment of this application.

For another example, FIG. 6 is a schematic flowchart of another adjustment of the current output of the driver according to an embodiment of this application. As shown in FIG. 6, this procedure may include the following S601 to S603:

S601: The motor control apparatus determines, based on the temperature of the motor driving system, the obtained instruction information, and a temperature prediction model, sustainable duration in which the motor rotates when being driven by the maximum load current output by the driver.

The temperature of the motor driving system may be the temperature obtained in S303 in the method shown in FIG. 3, or may be another temperature obtained by using a step same as S303. This is not limited herein. The instruction information may be the instruction information obtained in S301 in the method shown in FIG. 3, and details are not described herein again.

It should be noted that, the temperature prediction model has a function of predicting, based on the temperature of the motor driving system and the instruction information, the sustainable duration in which the motor rotates when being driven by the maximum load current output by the driver.

For example, the temperature prediction model may include: The motor control apparatus determines, based on the instruction information, that the maximum load current that the driver needs to output, and calculates a loss of the motor driving system based on the maximum load current (a loss of each component in the motor driving system may be separately calculated, for example, the calculation may be performed by using the method for calculating the loss of the motor driving system in the foregoing determining of the heat capacity margin). Then, the loss may be input into the thermal resistance network model to calculate and obtain a current temperature of each part of the motor driving system and a time length required for each part of the motor driving system to reach the temperature limit at the maximum load current. The time length is a time (that is, the foregoing sustainable duration) required for the motor driving system to reach the temperature limit at the maximum load current from the current temperature (that is, the obtained temperature of the motor driving system).

S602: The motor control apparatus determines whether rotation duration, of the motor, that starts when the driver outputs the maximum load current is equal to the sustainable duration (that is, whether the rotation duration reaches the sustainable duration).

If the rotation duration is equal to the sustainable duration, the following S603 is performed.

S603: The motor control apparatus controls the driver to output the rated peak current.

S603 is the same as S307 in the method shown in FIG. 3, and details are not described herein.

If the rotation duration is not equal to the sustainable duration, the S602 may be performed again until the rotation duration is equal to the sustainable duration.

It should be noted that, in some possible implementations, the foregoing process of adjusting the current output of the driver shown in FIG. 5 and the process of adjusting the current output of the driver shown in FIG. 6 may be implemented together. In this case, the output work status of the motor driving system is equal to the target output work status, or the rotation duration of the motor is equal to the sustainable duration. If the output work status of the motor driving system is equal to the target output work status, or the rotation duration of the motor is equal to the sustainable duration, the motor control apparatus controls the driver to output the rated peak current.

Figure 7:
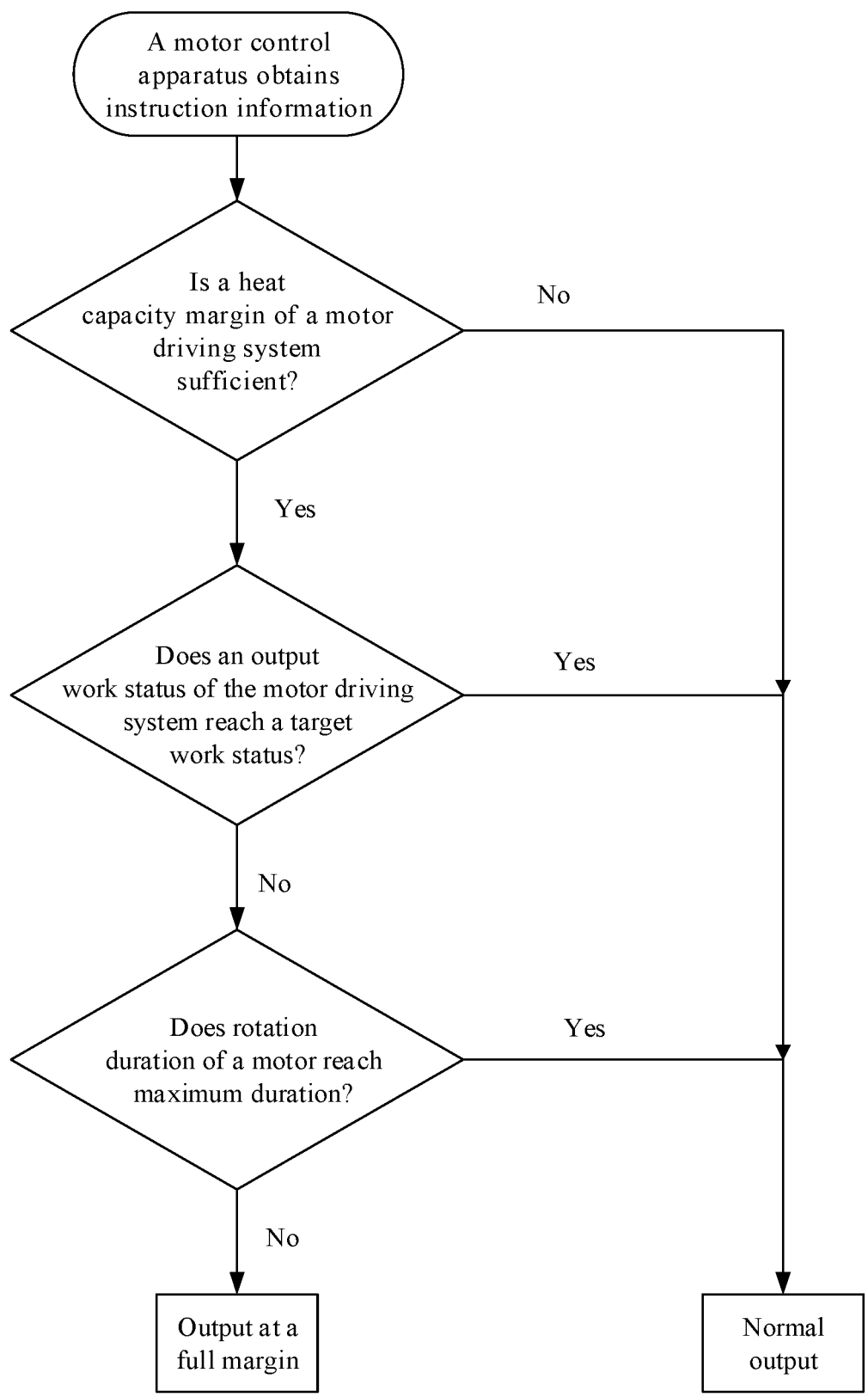
FIG. 7 is a schematic flowchart of another motor driving method according to an embodiment of this application.

For example, as shown in FIG. 7, after obtaining the instruction information, the motor control apparatus may determine whether the heat capacity margin of the motor driving system is sufficient (that is, whether the heat capacity margin of the motor driving system is greater than the heat capacity margin threshold). If the heat capacity margin of the motor driving system is insufficient, the motor control apparatus controls the driver to output the rated peak current (that is, to perform normal output). If the heat capacity margin of the motor driving system is sufficient, the motor control apparatus determines whether the output work status of the motor driving system (for example, the vehicle speed of the electric vehicle) is equal to (or reaches) the target output work status (for example, the target vehicle speed of the electric vehicle that is indicated by the instruction information). If the output work status of the motor driving system is equal to (or reaches) the target output work status, the motor control apparatus controls the driver to output the rated peak current. If the output work status of the motor driving system is not equal to (or does not reach) the target output work status, the motor control apparatus determines whether the rotation duration of the motor is equal to (or reaches) the sustainable duration (namely, maximum duration). If the rotation duration of the motor is equal to (or reaches) the sustainable duration, the motor control apparatus controls the driver to output the rated peak current. If the rotation duration of the motor is not equal to (or does not reach) the sustainable duration, the motor control apparatus controls the driver to output the maximum load current (that is, to perform output at the full margin). When the motor control apparatus controls the driver to perform output at the full margin, the foregoing three determining processes may be executed repeatedly until the motor control apparatus controls the driver to perform normal output.

According to the method in the foregoing embodiment, when the motor driving system needs to drive a driven piece (for example, the wheels of the electric vehicle) to output relatively high power, the motor control apparatus can control the driver to output a larger current (that is, make the driver exert the through-current capability improved by the redundancy design of the driver), so that a torque output by the motor is higher than a torque output by the motor rotating at the full torque and the full power in a normal case, thereby increasing the power output by the driven piece when being driven by the motor driving system, and improving abrupt acceleration performance of the driven piece.

Figure 8:
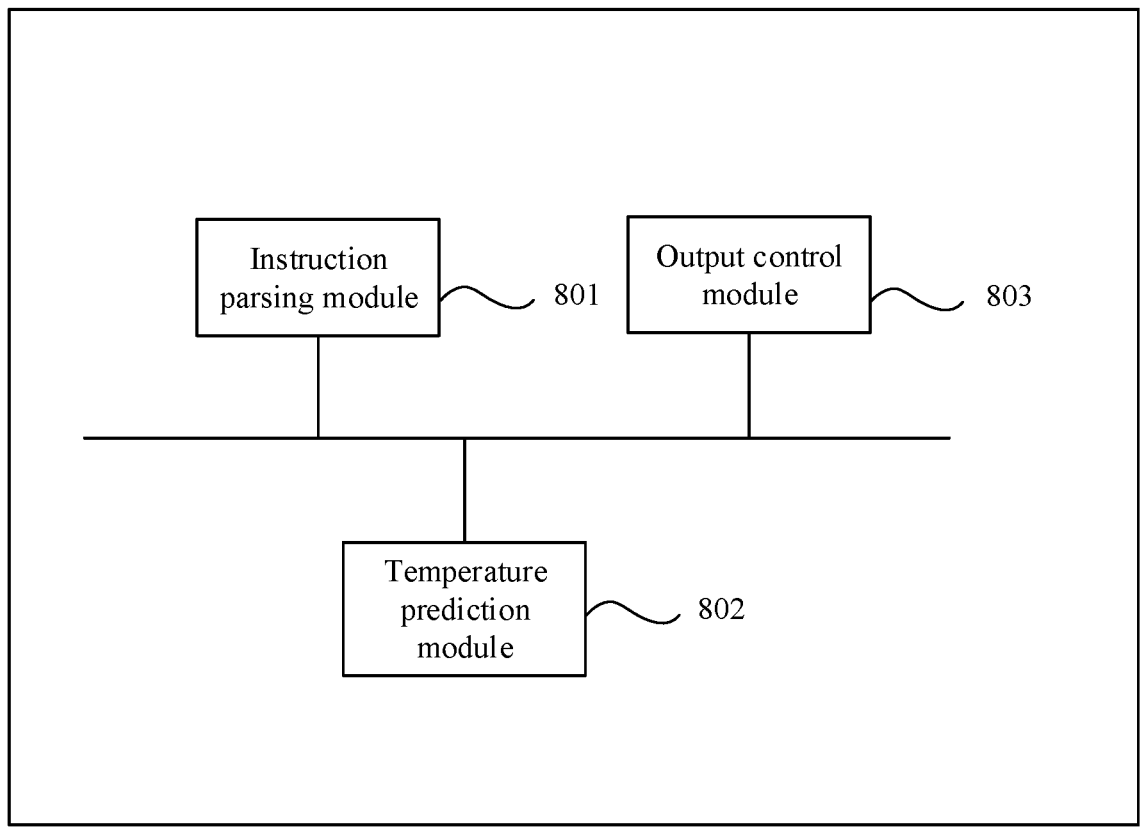
FIG. 8 is a schematic diagram of a structure of a motor control apparatus according to an embodiment of this application.

Corresponding to the method in the foregoing embodiment, an embodiment of this application further provides a motor control apparatus. The apparatus may be applied to the motor control system shown in FIG. 2, and is configured to implement the method in the foregoing embodiment. A function of the apparatus may be implemented by hardware, or may be implemented by hardware by executing corresponding software. The hardware or software includes one or more modules corresponding to the function. For example, FIG. 8 is a schematic diagram of a structure of a motor control apparatus. As shown in FIG. 8, the apparatus includes an instruction parsing module 801, a temperature prediction module 802, an output control module 803, and the like.

The instruction parsing module 801 may be configured to determine that a motor needs to rotate at a maximum torque.

The output control module 803 is configured to control a driver to output a first current to drive the motor to rotate. The first current is greater than a rated peak current of the driver and is less than or equal to a maximum load current of the driver.

In a possible implementation, the apparatus further includes: the temperature prediction module 802, configured to obtain a heat capacity margin of the motor driving system. The heat capacity margin is used to represent a margin of a temperature limit of the motor driving system relative to a current temperature. The output control module 803 is further configured to determine, based on the heat capacity margin, whether the current temperature of the motor driving system meets a condition for the motor to rotate at the first current. The output control module 803 is specifically configured to: when the current temperature of the motor driving system meets the condition for the motor to rotate at the first current, control the driver to output the first current.

In another possible implementation, the output control module 803 is further configured to: when the current temperature of the motor driving system does not meet the condition for the motor to rotate at the first current, control the driver to output the rated peak current to drive the motor to rotate.

In another possible implementation, the temperature prediction module 802 is specifically configured to obtain a temperature of the motor driving system; and determine the heat capacity margin based on the temperature of the motor driving system and a motor thermal resistance network model. The motor thermal resistance network model has a function of predicting the heat capacity margin based on the temperature of the motor driving system.

In another possible implementation, the motor control system further includes a temperature collection module (for example, the temperature collection module 202 in the motor control system shown in FIG. 2). The temperature prediction module 802 is specifically configured to receive the temperature of the motor driving system that is collected by the temperature collection module.

In another possible implementation, if the heat capacity margin is greater than a heat capacity margin threshold, the current temperature of the motor driving system meets the condition for the motor to rotate at the first current; or if the heat capacity margin is less than a heat capacity margin threshold, the current temperature of the motor driving system does not meet the condition for the motor to rotate at the first current.

In another possible implementation, the instruction parsing module 801 is specifically configured to obtain instruction information, where the instruction information is used to indicate a rotational speed and a torque that are output by the motor driving system; and determine, based on the instruction information, that the motor needs to rotate at the maximum torque.

In another possible implementation, the motor control system further includes an instruction collection module (for example, the instruction collection module 201 in the motor control system shown in FIG. 2). The instruction parsing module 801 is specifically configured to receive the instruction information collected by the instruction collection module.

In another possible implementation, the output control module 803 is further configured to obtain an output work status of the motor driving system, where the output work status includes a speed value output by the motor driving system; and if the output work status of the motor driving system is equal to a target output work status corresponding to the instruction information, control the driver to output the rated peak current, where the target output work status includes a target speed value that is output by the motor driving system and that corresponds to the instruction information.

In another possible implementation, the motor control system further includes a work status collection module (for example, the work status collection module 203 in the motor control system shown in FIG. 2). The output control module 803 is specifically configured to receive the output work status of the motor driving system that is collected by the work status collection module.

In another possible implementation, the output control module 803 is further configured to determine, based on the temperature of the motor driving system, the instruction information, and a temperature prediction model, sustainable duration in which the motor rotates when being driven by the first current output by the driver, where the temperature prediction model has a function of predicting the sustainable duration based on a temperature of the motor and the instruction information; and if rotation duration, of the motor, that starts when the driver outputs the first current is equal to the sustainable duration, control the driver to output the rated peak current.

It should be understood that, the division of the units or the modules (referred to as units below) in the foregoing apparatus is merely division of logical functions. In actual implementation, all or some of the units or modules may be integrated into a physical entity, or may be physically separated. In addition, all the units in the apparatus may be implemented in a form of software invoked by a processing element; or may be implemented in a form of hardware;

or some units may be implemented in a form of software invoked by a processing element, and some units may be implemented in a form of hardware.

For example, units may be separately disposed processing elements, or may be integrated into a chip of the apparatus for implementation. In addition, the units may be stored in a memory in a program form, and is invoked by a processing element of the apparatus to perform functions of the units. In addition, all or some of the units may be integrated together, or may be implemented independently. The processing element herein may also be referred to as a processor, and may be an integrated circuit having a signal processing capability. In an implementation process, the steps in the foregoing methods or the foregoing units may be implemented by using a hardware integrated logic circuit of the processor element, or may be implemented in a form of software invoked by the processing element.

In an example, a unit in the foregoing apparatus may be configured as one or more integrated circuits for implementing the foregoing method, such as one or more ASICs, one or more DSPs, one or more FPGAs, or a combination of at least two of these integrated circuit forms.

For another example, when a unit in the apparatus may be implemented in a manner in which a processing element schedules a program, the processing element may be a general-purpose processor, such as a CPU or another processor that can invoke a program. For still another example, the units may be integrated and implemented in a form of a system-on-a-chip (SoC).

In one implementation, a unit in the foregoing apparatus for implementing each corresponding step in the foregoing method may be implemented in a manner in which a processing element schedules a program. For example, the apparatus may include a processing element and a storage element, and the processing element invokes a program stored in the storage element to execute the method described in the foregoing method embodiment. The storage element may be a storage element located on a same chip as the processing element, namely, an on-chip storage element.

In another implementation, a program configured to execute the foregoing method may be located on a storage element on a chip different from that for the processing element, that is, located on an off-chip storage element. In this case, the processing element invokes the program from the off-chip storage element or loads the program from the off-chip storage element onto an on-chip storage element, so as to invoke and execute the method described in the foregoing method embodiment.

For example, an embodiment of this application may further provide an apparatus, for example, the motor control apparatus 200 in the motor control system shown in FIG. 2. The apparatus may include a processor and a memory that is configured to store instructions executable by the processor. When the processor is configured to execute the foregoing instructions, the motor control apparatus is enabled to implement the motor driving method described in the foregoing embodiment. The memory may be located inside the motor control apparatus, or may be located outside the motor control apparatus. In addition, there are one or more processors.

In still another implementation, a unit in the apparatus for implementing each corresponding step in the foregoing method may be configured as one or more processing elements. The processing element may be disposed on the corresponding motor control apparatus. The processing element herein may be an integrated circuit, such as one or more ASICs, one or more DSPs, one or more FPGAs, or a combination of these types of integrated circuits. These integrated circuits may be integrated together to form a chip.

For example, an embodiment of this application further provides a chip. The chip may be applied to the foregoing motor control apparatus. The chip includes one or more interface circuits and one or more processors. The interface circuit is interconnected with the processor by using a line. The processor receives computer instructions from the memory of the motor control apparatus by using the interface circuit and executes the computer instructions, so as to implement the method described in the foregoing method embodiments.

Based on the foregoing descriptions of the implementations, a person skilled in the art may clearly understand that for the purpose of convenient and brief descriptions, division into the foregoing functional modules is merely used as an example for illustration. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiments are merely examples. For example, division into the modules or units is merely logical function division, and may be other division during actual implementation. For example, a plurality of units or components may be combined or may be integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may be one or more physical units, in other words, may be located in one place, or may be distributed on a plurality of different places. Some or all of the units may be selected based on an actual requirement to achieve an objective of the solutions of embodiments.

In addition, function units in embodiments of this application may be integrated into one processing unit, or each of the units may exist alone physically, or two or more units may be integrated into one unit. The integrated unit may be implemented in a form of hardware, or may be implemented in a form of a software function unit.

An embodiment of this application further provides a vehicle. The vehicle may include a motor control apparatus (for example, the motor control apparatus 200 in the motor control system shown in FIG. 2). The motor control apparatus may perform the method described in the foregoing method embodiment, to implement a corresponding function or effect.

The foregoing description is merely a specific implementation of this application, but is not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A motor driving method, applied to a motor control apparatus in a motor control system, wherein the motor control apparatus is configured to control a driver of a motor in a motor driving system, and the method comprises:
   determining, by the motor control apparatus, that the motor needs to rotate at a maximum torque; and
   controlling, by the motor control apparatus, the driver to output a first current to drive the motor to rotate, wherein the first current is greater than a rated peak current of the driver and is less than or equal to a maximum load current of the driver.

2. The method according to claim 1, wherein before controlling, by the motor control apparatus, the driver to output the first current to drive the motor to rotate, the method further comprises:
   obtaining, by the motor control apparatus, a heat capacity margin of the motor driving system, wherein the heat capacity margin is used to represent a margin of a temperature limit of the motor driving system relative to a current temperature;
   determining, by the motor control apparatus based on the heat capacity margin, whether the current temperature of the motor driving system meets a condition for the motor to rotate at the first current; and
   the controlling, by the motor control apparatus, the driver to output the first current comprises:
   when the current temperature of the motor driving system meets the condition for the motor to rotate at the first current, controlling, by the motor control apparatus, the driver to output the first current.

3. The method according to claim 2, wherein after determining, by the motor control apparatus based on the heat capacity margin, whether the current temperature of the motor driving system meets the condition for the motor to rotate at the first current, the method further comprises:
   when the current temperature of the motor driving system does not meet the condition for the motor to rotate at the first current, controlling, by the motor control apparatus, the driver to output the rated peak current to drive the motor to rotate.

4. The method according to claim 2, wherein the obtaining, by the motor control apparatus, the heat capacity margin of the motor driving system comprises:
   obtaining, by the motor control apparatus, a temperature of the motor driving system; and
   determining, by the motor control apparatus, the heat capacity margin based on the temperature of the motor driving system and a motor thermal resistance network model, wherein the motor thermal resistance network model has a function of predicting the heat capacity margin based on the temperature of the motor driving system.

5. The method according to claim 4, wherein
   the obtaining, by the motor control apparatus, the temperature of the motor driving system comprises:
   receiving, by the motor control apparatus, the temperature of the motor driving system from a temperature collection module of the motor control system.

6. The method according to claim 2, wherein
if the heat capacity margin is greater than a heat capacity margin threshold, the current temperature of the motor driving system meets the condition for the motor to rotate at the first current; or
if the heat capacity margin is less than a heat capacity margin threshold, the current temperature of the motor driving system does not meet the condition for the motor to rotate at the first current.

7. The method according to claim 1, wherein the determining, by the motor control apparatus, that the motor needs to rotate at the maximum torque comprises:
obtaining, by the motor control apparatus, instruction information indicating a rotational speed and a torque that are output by the motor driving system; and
determining, by the motor control apparatus based on the instruction information, that the motor needs to rotate at the maximum torque.

8. The method according to claim 7, wherein
the obtaining, by the motor control apparatus, the instruction information comprises:
receiving, by the motor control apparatus, the instruction information from an instruction collection module of the motor control system.

9. The method according to claim 7, wherein after controlling, by the motor control apparatus, the driver to output the first current, the method further comprises:
obtaining, by the motor control apparatus, an output work status of the motor driving system, wherein the output work status comprises a speed value output by the motor driving system; and
if the output work status of the motor driving system is equal to a target output work status corresponding to the instruction information, controlling, by the motor control apparatus, the driver to output the rated peak current, wherein the target output work status comprises a target speed value that is output by the motor driving system and that corresponds to the instruction information.

10. The method according to claim 9, wherein
the obtaining, by the motor control apparatus, the output work status of the motor driving system comprises:
receiving, by the motor control apparatus, the output work status of the motor driving system from a work status collection module of the motor control system.

11. A motor control apparatus, applied to a motor control system to control a driver of a motor in a motor driving system, wherein the motor control apparatus comprises:
one or more processors; and
one or more memories coupled to the one or more processors and configured to store program instructions that, when executed by the one or more processors, cause the motor control apparatus to:
determine that the motor needs to rotate at a maximum torque; and
control the driver to output a first current to drive the motor to rotate, wherein the first current is greater than a rated peak current of the driver and is less than or equal to a maximum load current of the driver.

12. The apparatus according to claim 11, wherein the program instructions, when executed by the one or more processors, further cause the motor control apparatus to:
obtain a heat capacity margin of the motor driving system, wherein the heat capacity margin is used to represent a margin of a temperature limit of the motor driving system relative to a current temperature;
determine, based on the heat capacity margin, whether the current temperature of the motor driving system meets a condition for the motor to rotate at the first current; and
when the current temperature of the motor driving system meets the condition for the motor to rotate at the first current, control the driver to output the first current.

13. The apparatus according to claim 12, wherein the program instructions, when executed by the one or more processors, further cause the motor control apparatus to:
when the current temperature of the motor driving system does not meet the condition for the motor to rotate at the first current, control the driver to output the rated peak current to drive the motor to rotate.

14. The apparatus according to claim 12, wherein the program instructions, when executed by the one or more processors, further cause the motor control apparatus to:
obtain a temperature of the motor driving system; and
determine the heat capacity margin based on the temperature of the motor driving system and a motor thermal resistance network model, wherein the motor thermal resistance network model has a function of predicting the heat capacity margin based on the temperature of the motor driving system.

15. The apparatus according to claim 14, wherein the program instructions, when executed by the one or more processors, further cause the motor control apparatus to:
receive the temperature of the motor driving system from a temperature collection module of the motor control system.

16. The apparatus according to claim 12, wherein
if the heat capacity margin is greater than a heat capacity margin threshold, the current temperature of the motor driving system meets the condition for the motor to rotate at the first current; or
if the heat capacity margin is less than the heat capacity margin threshold, the current temperature of the motor driving system does not meet the condition for the motor to rotate at the first current.

17. The apparatus according to claim 11, wherein the program instructions, when executed by the one or more processors, further cause the motor control apparatus to:
obtain instruction information indicating a rotational speed and a torque that are output by the motor driving system; and
determine, based on the instruction information, that the motor needs to rotate at the maximum torque.

18. A motor control system, comprising a motor control apparatus for controlling a driver of a motor in the motor driving system, wherein the motor control apparatus is configured to:
determine that the motor needs to rotate at a maximum torque; and
control the driver to output a first current to drive the motor to rotate, wherein the first current is greater than a rated peak current of the driver and is less than or equal to a maximum load current of the driver.

19. The motor control system according to claim 18, wherein before controlling the driver to output the first current to drive the motor to rotate, the motor control apparatus is configured to:
obtain a heat capacity margin of the motor driving system, wherein the heat capacity margin is used to represent a margin of a temperature limit of the motor driving system relative to a current temperature;

determine, based on the heat capacity margin, whether the current temperature of the motor driving system meets a condition for the motor to rotate at the first current; wherein the motor control apparatus is configured to control the driver to output the first current when the current temperature of the motor driving system meets the condition for the motor to rotate at the first current.

20. The motor control system according to claim 19, wherein after determining, based on the heat capacity margin, whether the current temperature of the motor driving system meets the condition for the motor to rotate at the first current, the motor control apparatus is further configured to control the driver to output the rated peak current to drive the motor to rotate when the current temperature of the motor driving system does not meet the condition for the motor to rotate at the first current.

* * * * *